United States Patent Office 3,151,154
Patented Sept. 29, 1964

3,151,154
DECOLORIZING PHTHALIC ACIDS
Herbert Sargent, Garden Grove, and Lawrence M. Richards, La Habra, Calif., assignors to Richfield Oil Corporation, Los Angeles, Calif., a corporation of Delaware
No Drawing. Filed Jan. 29, 1959, Ser. No. 789,773
6 Claims. (Cl. 260—525)

This invention concerns the elimination of color from crude phthalic acid materials. The phthalic acids produced by nitric acid oxidation of the corresponding xylenes or toluic acids are contaminated with minor amounts of nitrogen compounds that are, even in small amounts, detrimental to the usefulness of the phthalic acids. The instability and reactivity of these compounds lead to undesirably dark-colored products upon standing or exposure to elevated temperatures or actinic light. The presence of even small amounts of such bodies in phthalic acids results in the formation of dark-colored alkyd resins and esters. The present invention is concerned with the removal of these nitro impurities by subjecting the phthalic acids containing these impurities to catalytic hydrogenation followed by crystallization of purified phthalic acid from a strongly acidic solution.

The color-forming bodies are probably trace amounts of aromatic or benzene nitro compounds but other impurities of undetermined constitution contribute to the undesired discoloration of the phthalic acid mixtures. The impurities are occluded in the phthalic acid crystals recovered from the oxidation process. Although these crystals are frequently colorless in appearance and, therefore, acceptable for many uses without further processing, analytical methods, such as those involving measurement of light transmitted by the product in a standardized aqueous caustic solution, may show the presence of impurities. For certain uses, it is desirable to reduce even this amount of color impurities; for example, in phthalic acids used to produce alkyl resins, the nitro impurities must be reduced to 0.1% or less. In uses which require less rigorous specifications it is frequently found that the mere removal of color so that the product is white or near white to the eye is satisfactory. The process of this invention is useful in reducing the color of phthalic acid to the various extents desired and therefore highly colored stocks may be substantially reduced in color to lighter colored stocks, or made colorless to the eye, or even further reduced in color so that in a standardized caustic soda solution they exhibit 60% or more light transmission at 365 $\mu$.

Although it is known that phthalic acids can be decolorized by treatment with salts such as sodium bisulfite, this method has the disadvantage that inorganic, non-volatile contaminants are introduced into the phthalic acid mixture. Furthermore, even under optimum conditions this process does not give complete reduction of the nitro compounds, as shown in British Patent 695,170. Likewise, reduction of nitroaromatic acids to amine aromatic acids by means of a reducing metal introduces into the reaction mixture undesired inorganic contaminants and this process is reported in U.S. Patent 1,492,664 to give an increase in undesired color contaminants unless the reaction conditions are rigorously controlled.

Furthermore, while it has been suggested in Canadian Patent 524,440 that organic acids containing nitro impurities may be reduced by sulfur dioxide and then acidified to precipitate phthalic acid, this method requires a basic-acting reagent to preliminarily solubilize the aromatic acid. The process of this invention obviates the need for this reagent and for the excess acid later needed to crystallize phthalic acid from the resulting somewhat buffered solution. Instead of converting the nitro impurities to sulfur-containing acids which are slightly more soluble in water than phthalic acid, as in the method of the Canadian patent, the process of this invention uses a reduction method which converts the nitro impurities to compounds containing a basic amino group and then by acidification converts these materials to amine salts, which differ widely from unsubstituted phthalic acid in solubility characteristics and therefore give a sharper crystallization of the acid.

The method of the invention comprises contacting a solution of the phthalic acid produced by the nitric acid oxidation of for instance, xylene or toluic acid, and containing the impurities resulting from the oxidation, with a free-hydrogen-containing gas in the presence of a hydrogenation catalyst under temperature and pressure conditions suitable for the reduction of the nitro compounds contained in the mixture, acidifying a solution of the reduced product to a pH not greater than about 2, e.g., 1 or even to a pH of 0, by the addition of a suitable quality of a strong mineral acid such as sulfuric, hydrochloric, nitric, phosphoric, etc., and recovering the phthalic acid which crystallizes out of the solution. The solution resulting from the hydrogenation treatment may itself be acidified, or the phthalic acid containing the reduced impurities may be removed from this solution by precipitation, evaporation of the solvent, etc., and redissolved before acidification.

Conditions of hydrogenation have been found which avoid appreciable loss of phthalic acid through hydrogenation of the benzene ring. The lower temperature limit at which the reaction is conducted is determined by two conditions: the temperature at which dissolution of the crude phthalic acid mixture is substantially complete and the temperature at which the catalyst chosen is effective. Although certain catalysts, such as active platinum oxide, effect some decoloration of the crude acids mixtures at room temperature, higher temperatures from about 100 to 250° C. are preferred in practice. The upper limit will depend on the catalyst activity. The reaction mass should not reach a temperature at which appreciable reduction of the aromatic nucleus occurs with any given catalyst, and need not be greater than about 250° C.

The reaction mass must be kept under a total pressure sufficient to maintain the mass in the liquid phase. The pressure, in practice, varies from about 50 to 2000 p.s.i. The hydrogen partial pressure is not critical, ranging from nearly zero to several hundred pounds per square inch. However, as with the temperature, the hydrogen partial pressure selected is somewhat dependent upon the catalyst used, and generally at least about a stoichiometric amount of hydrogen is supplied based on the nitro content of the feedstock. Less active catalysts require higher hydrogen pressures than more active catalysts. Although pressures higher than those that will give a practical rate of reduction of nitrophthalic acids for a given temperature and catalyst can be used, only slight advantage is gained by doing so. Excessive pressure only requires the use of stronger and more expensive equipment. A slight excess of hydrogen over stoichiometric quantities is preferred to insure complete reduction of the aromatic nitro compounds. Copending application Serial No. 709,735, filed January 20, 1958, gives a further explanation of the hydrogenation and that application is hereby incorporated by reference.

The phthalic acids which can be treated in the process of the invention are derived from the nitric acid oxidation of various feedstocks, and the product may comprise the individual isomers of the acids or their mixtures. The phthalic acids produced vary in color from light yellow to white with the major differences being particularly apparent in alkaline solutions. The products derived from the oxidation of xylenes often have a yellow hue which color, after treatment in accordance with this invention, is reduced to a substantial degree. Generally, the phthalic acids are afforded by oxidation of lower dialkylbenzenes or lower alkylbenzoic acids. Advantageously, the crude phthalic acid products can be obtained by the liquid phase nitric acid oxidation of toluic acid at a temperature from about 150° to 250° C. The reduction treatment of the present invention is not confined to the free phthalic acids; inorganic salts of the acids may be treated. Suitable salts include particularly the ammonium salts and those of the alkaline metals, such as the alkali metals sodium and potassium and the alkaline earth metals, calcium and barium. The use of these salts, however, requires a greater quantity of acid to be used in the subsequent crystallization step, and the buffering due to the presence of the alkaline metal ions may prevent reaching a suitably low pH without the use of prohibitive amounts of acid. The process of the invention is applicable to ortho-, meta- or para-phthalic acids and salts individually, or in mixtures. Such a mixture is produced, for example, when a mixture of 70% meta-toluic acid and 30% para-toluic acid is oxidized in a glass vessel by contact with 10% aqueous nitric acid at 200° C. and 275 p.s.i.g. with the use of 4.3 moles of nitric acid per mole of toluic acid.

The crude phthalic acid mixture must be dissolved for the process to be most effective. Solution can be accomplished by the use of any liquid which will dissolve the crude mixture and will not enter side reactions in the process. Suitable inert solvents include water; the lower aliphatic alkanols, ethanol and methanol; and other polar solvents such as the lower aliphatic carboxylic acids. Water is the preferred solvent. The necessity for dissolving the crude phthalic acids mixture is shown by the following example.

A mass of crude phthalic acid crystals produced by the nitric acid oxidation of toluic acid, was mixed at room temperature with water in an amount insufficient to dissolve the crystals. The resulting slurry was subjected to hydrogen gas in the presence of a platinum catalyst. The theoretical amount of hydrogen needed to reduce all of the nitro compounds in the acid crystals was calculated, but the reaction stopped after only 10% of this amount of hydrogen was consumed. The addition of a measured quantity of nitro-phthalic acid and further agitation resulted in a consumption of the theoretical amount of hydrogen corresponding to the added nitro-phthalic acid only. Based on this observation it can be concluded that the nitro-phthalic acid is occluded in the crystal lattice of the crude phthalic acid and that solution of the crude phthalic acid mixture is necessary for most complete reduction of the nitro-phthalic acid impurities therein.

Any solid material which will catalyze a hydrogenation reaction is suitable for use as a catalyst in this process. Metal hydrogenation catalysts are well known and include such metals as cobalt, iron, molybdenum, nickel, the noble metals platinum, palladium and rhodium and combinations of the foregoing, advantageously disposed on a suitable support, for example alumina. Adams catalyst which is platinic oxide (platinum dioxide), platinum on a support such as carbon, palladium, supported or unsupported, and Raney nickel have been found to be suitable. Convenient catalysts are those of the metals of group VIII and the preferred catalyst is platinum oxide. With a platinum catalyst the nitro compound in the phthalic acid may be reduced to undetectable amounts. Crude phthalic acid mixtures hydrogenated in the presence of a platinum oxide catalyst yielded treated phthalic acids which in turn gave alkyd resins which were much lighter in color, the Gardner colors for the resins being around 18 for untreated crude mixtures and around 8 for treated mixtures.

The contacting of the hydrogen, catalyst and impure phthalic acid can be done in a batchwise manner, all of the materials being added at once to the reactor with a stirring of the reactor contents. A continuous process is also practical, using a fixed, moving or fluidized bed of catalyst. In the fixed or moving bed embodiment the hydrogen and the crude phthalic acid solution are fed to the catalyst-containing reactor either concurrently or countercurrently.

Following the reduction, the solution is separated from the catalyst by filtration or other means, then made strongly acidic; and upon cooling or partial evaporation of the solvent, the purified phthalic acids are crystallized and separated from the remaining liquid phase containing the amine salts of the reduced impurities. Insofar as the crystallization step is concerned for recovery of the pure phthalic acids from the reduced product, water is the preferred solvent although other solvents such as methanol, ethanol, acetic acid, etc., and their mixtures with each other and/or water may be used. The solvents used for the reduction step can be selected so that they also serve as solvents for the crystallization. The pH of the solution is lowered from that due to the phthalic acids (approximately 3) to a pH of about 2, 1 or even to a pH of 0 by the addition of a suitable quantity of a strong acid such as sulfuric, hydrochloric, nitric, phosphoric, etc. The temperature conditions for recovery of the pure acids in the crystallization step are essentially the same as for the reduction step.

The following specific example of the process of this invention is to be considered illustrative only and not limiting.

The product of a nitric acid oxidation of toluic acid analyzed as 88.1% o-phthalic acid, 3.9% isophthalic acid and 1.3% terephthalic acid. 100 grams of this product containing 3.8% nitrophthalic acid was dissolved in 1 liter of ethanol and reduced catalytically by shaking with hydrogen in the presence of a platinum oxide catalyst. The reduction proceeded rapidly at room temperature and pressure until a volume of 1.277 liters of hydrogen was absorbed in 4.5 hours. The mixture was filtered to remove catalyst and then evaporated under vacuum to give a residue weighing 98 grams. Several 20 g. portions of this residue were taken, one of which was recrystallized from 250 ml. of water, yielding 16 g. of phthalic acids after filtering and drying. Another 20 g. portion was recrystallized from 250 ml. of 0.49 N hydrochloric acid. This acidified aqueous medium had a pH of about 0.16 and gave 17 g. of crystalline phthalic acid after filtration and drying. The analytical results for the crude reduced product as well as the two recrystallized portions are tabulated below:

| Sample No. | Sample Description | Amino N, p.p.m.[1] |
|---|---|---|
| A | Crude reduction product | 123 |
| B | Recrystallized from water | 89 |
| C | Recrystallized from 0.49 N HCl | 41 |

[1] Amino nitrogen was determined colorimetrically by formation of a diazo dye.

Similar results are obtained when other portions of this crude reduced product are recrystallized from a sulfuric acid solution. Likewise, good results are obtained when reduction and crystallization are conducted using 100 grams of the sodium, ammonium or calcium salts of impure phthalic acid of the above example. Also, in each of these reductions the ethanol may be replaced by 3 liters of water. These results show that catalytic hydrogenation combined with crystallization of the phthalic acid from a solution at a very low pH is effective in eliminating nitrogenous impurities from a crude phthalic acid.

We claim:

1. In a method of eliminating color-forming material from an impure phthalic acid material selected from the group consisting of phthalic acids and the ammonium and alkali and alkaline earth metal salts of said acids produced by nitric acid oxidation of a material selected from the group consisting of diloweralkyl benzenes and loweralkyl benzoic acids, the steps consisting essentially of reducing the nitro compounds contained in a solution of said impure material, in a liquid polar solvent selected from the group consisting of water, acetic acid and lower alkanols, to amino compounds by contacting the solution with hydrogen gas at a temperature of about 100 to 250° C. and a pressure of about 50 to 2000 p.s.i. in the presence of a solid group VIII metal hydrogenation catalyst and acidifying a liquid solution of the resulting reduced product in polar solvent selected from the group consisting of water, acetic acid and lower alkanols with a strong mineral acid to a pH less than about 2 to convert amines to amine salts, and recovering phthalic acid by crystallization from the solution.

2. The method of claim 1 in which crystallization is performed by cooling the solution.

3. The method of claim 1 in which the solvent of the reducing step is water.

4. The method of claim 3 in which the solvent of the acidification step is water.

5. In a method of eliminating color-forming materials from impure phthalic acids produced by nitric acid oxidation of toluic acids, the steps consisting essentially of reducing the nitro compounds contained in a liquid aqueous solution of said impure acids to amino compounds by contacting the solution with hydrogen gas at a temperature of about 100 to 250° C. and a pressure of about 50 to 2000 p.s.i. in the presence of a solid group VIII metal hydrogenation catalyst and acidifying a liquid aqueous solution of the resulting reduced product with a strong mineral acid to a pH less than about 2 to convert amines to amine salts, and recovering phthalic acid by crystallization from the solution.

6. The method of claim 5 in which the catalyst is platinum oxide.

References Cited in the file of this patent
UNITED STATES PATENTS

| | | |
|---|---|---|
| 1,332,028 | Coblentz et al. | Feb. 24, 1920 |
| 2,744,938 | Urban | May 8, 1956 |

FOREIGN PATENTS

| | | |
|---|---|---|
| 524,440 | Canada | May 1, 1956 |

OTHER REFERENCES

Robertson, Organic Synthesis, Coll. vol. I, pp. 52–53 (1941).

Fieser et al., Organic Chemistry, pages 221–224 (2nd ed., 1950).

Greenberg, Amino Acids and Proteins, pages 27–28 (1951).

Wagner et al., Synthetic Organic Chemistry, pages 654–7 (1953).